US010036569B2

United States Patent
Jones (10) Patent No.: US 10,036,569 B2
(45) Date of Patent: Jul. 31, 2018

(54) NOISE REDUCING POPPET VALVE (75) Inventor: Roderick M. Jones, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 2000 days.

(21) Appl. No.: 12/403,827

(22) Filed: Mar. 13, 2009

(65) Prior Publication Data

US 2010/0230627 A1    Sep. 16, 2010

(51) Int. Cl.
| | |
|---|---|
| F24F 13/06 | (2006.01) |
| B60H 1/34 | (2006.01) |
| B64D 13/00 | (2006.01) |
| F24F 13/065 | (2006.01) |
| B60H 1/00 | (2006.01) |

(52) U.S. Cl.
CPC ......... *F24F 13/065* (2013.01); *B60H 1/3442* (2013.01); *B64D 13/00* (2013.01); *B60H 2001/006* (2013.01); *B64D 2013/003* (2013.01)

(58) Field of Classification Search
CPC ............. B60H 1/3442; B60H 2001/006; F24F 13/065; B64D 13/00; B64D 2013/003
USPC ......... 239/587.1, 587.2, 587.3, 587.4, 587.5, 239/587.6; 454/71, 76, 154, 286, 323, 454/333
See application file for complete search history.

(56) References Cited

U.S. PATENT DOCUMENTS

| | | | |
|---|---|---|---|
| 3,113,502 A | | 7/1961 | Kallel et al. |
| 5,399,119 A | * | 3/1995 | Birk et al. ............ 454/76 |
| 6,402,610 B1 | | 6/2002 | Gloisten |
| 6,610,116 B1 | | 8/2003 | Avery |
| 6,645,065 B2 | * | 11/2003 | Rooney et al. ............ 454/154 |
| 6,887,147 B2 | | 5/2005 | Thomassin et al. |
| 7,070,496 B2 | * | 7/2006 | Thomassin et al. ............ 454/71 |
| 7,093,821 B2 | * | 8/2006 | Howe ............ 251/218 |
| 2006/0172681 A1 | * | 8/2006 | Steinbeiss ............ 454/152 |

OTHER PUBLICATIONS

Audio International Installation & Operations Manual, Model #95-320-xx-x, Air Grasper Assembly, Document #540148, Audio International, North Little Rock AR, 7 pages, Mar. 2000.

* cited by examiner

*Primary Examiner* — Steven J Ganey
*Assistant Examiner* — Steven M Cernoch
(74) *Attorney, Agent, or Firm* — Patterson + Sheridan, LLP (57) ABSTRACT

A personal valve apparatus includes an air inlet, an air outlet, a nozzle, a valve seat, and a moveable poppet valve. The nozzle comprises an inner air-flow surface having a nozzle cavity, extending along the inner air-flow surface, in communication with the air inlet. The valve seat comprises a seat member disposed over the nozzle cavity at the air inlet. The moveable poppet valve is disposed over the seat member and the nozzle cavity at the air inlet. The moveable poppet valve comprises a convex surface. When the moveable poppet valve is in an open position, the convex surface is disposed over and apart from the seat member at the air inlet and configured to allow air to flow from the air inlet, against the convex surface at the air inlet, between the seat member and the convex surface at the air inlet, into and through the nozzle cavity, and out of the air outlet.

13 Claims, 11 Drawing Sheets

FIG. 12

NOISE REDUCING POPPET VALVE

FIELD OF THE DISCLOSURE

The field of the disclosure relates to noise reducing personal valve apparatus, such as aircraft personal air outlet valve apparatus, and to methods of reducing noise in such apparatus.

BACKGROUND OF THE DISCLOSURE

Conventional valve apparatus may utilize internal poppet valves which may be flat, may have relatively sharp corners and edges, and/or may have concave shapes. Other conventional valve apparatus may utilize curved nozzles. Due to the shapes of the internal poppet valves and the curved nozzles, air flowing through conventional valve apparatus may experience an increased amount of drag, flow separation, and turbulence thereby leading to increased air flow noise. This may be annoying to people near a conventional valve apparatus, such as to passengers in an aircraft utilizing a conventional valve apparatus as a personal air outlet with the passenger seat.

An apparatus and method is needed which may solve one or more issues of one or more of the conventional valve apparatus and/or methods of flowing air through a valve apparatus.

SUMMARY OF THE DISCLOSURE

In one embodiment, a personal valve apparatus is provided. The personal valve apparatus may comprise an air inlet, an air outlet, a nozzle, a valve seat, and a moveable poppet valve. The nozzle may comprise an inner air-flow surface having a nozzle cavity, extending along the inner air-flow surface, in communication with the air inlet. The valve seat may comprise a seat member disposed over the nozzle cavity at the air inlet. The moveable poppet valve may be disposed over the seat member and the nozzle cavity at the air inlet. The moveable poppet valve may comprise a convex surface which in an open position may be disposed over and apart from the seat member at the air inlet and configured to allow air to flow from the air inlet, against the convex surface at the air inlet, between the seat member and the convex surface at the air inlet, into and through the nozzle cavity, and out of the air outlet.

In another embodiment, a personal valve apparatus may be provided. The personal valve apparatus may comprise an air inlet, an air outlet, a nozzle, a valve seat, a moveable poppet valve, and a stop cage. The nozzle may comprise a substantially straight inner air-flow surface having a nozzle cavity, extending along the substantially straight inner air-flow surface, in communication with the air inlet. The valve seat may comprise a seat member disposed over and at an end of the nozzle cavity at the air inlet. The moveable poppet valve may be disposed over the seat member and the nozzle cavity at the air inlet. The moveable poppet valve may comprise a convex surface which in an open position may be disposed over and apart from the seat member at the air inlet and configured to allow air to flow from the air inlet, against the convex surface at the air inlet, between the seat member and the convex surface at the air inlet, into and through the nozzle cavity, and out of the air outlet. In a closed position the convex surface may be disposed over and against the seat member at the air inlet and configured to substantially prevent air, flowing from the air inlet, from flowing: between the seat member and the convex surface at the air inlet, into and through the nozzle cavity, and out of the air outlet. The stop cage may be disposed, at the air inlet, over the moveable poppet valve, the seat member, and the nozzle cavity.

In an additional embodiment, a method of reducing noise in a valve apparatus is disclosed. In one step, a valve apparatus may be provided. The provided valve apparatus may comprise an air inlet, an air outlet, a nozzle, a valve seat, and a moveable poppet valve. The nozzle may comprise an inner air-flow surface having a nozzle cavity, extending along the inner air-flow surface, in communication with the air inlet. The valve seat may comprise a seat member disposed over the nozzle cavity at the air inlet. The moveable poppet valve may be disposed, at the air inlet, over the seat member and the nozzle cavity. The moveable poppet valve may comprise a convex surface. In another step, the moveable poppet valve may be opened by disposing the convex surface over and apart from the seat member at the air inlet to flow air from the air inlet, against the convex surface at the air inlet, between the seat member and the convex surface at the air inlet, into and through the nozzle cavity, and out of the air outlet. In still another step, the moveable poppet valve may be closed by disposing the convex surface, at the air inlet, over and against the seat member to substantially prevent air, flowing from the air inlet, from: flowing between the seat member and the convex surface at the air inlet, into and through the nozzle cavity, and out of the air outlet.

One or more embodiments of the disclosure may reduce one or more issues of one or more of the conventional valve apparatus and/or methods of flowing air within a conventional valve apparatus. For instance, one or more embodiments of the disclosure may decrease drag, may decrease flow separation, may decrease turbulence, and/or may decrease air flow noise within the valve apparatus. This may reduce noise-levels to humans near the valve apparatus. In other embodiments, additional types of problems of one or more conventional valve apparatus, and/or methods of flowing air within a conventional valve apparatus, may be reduced.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
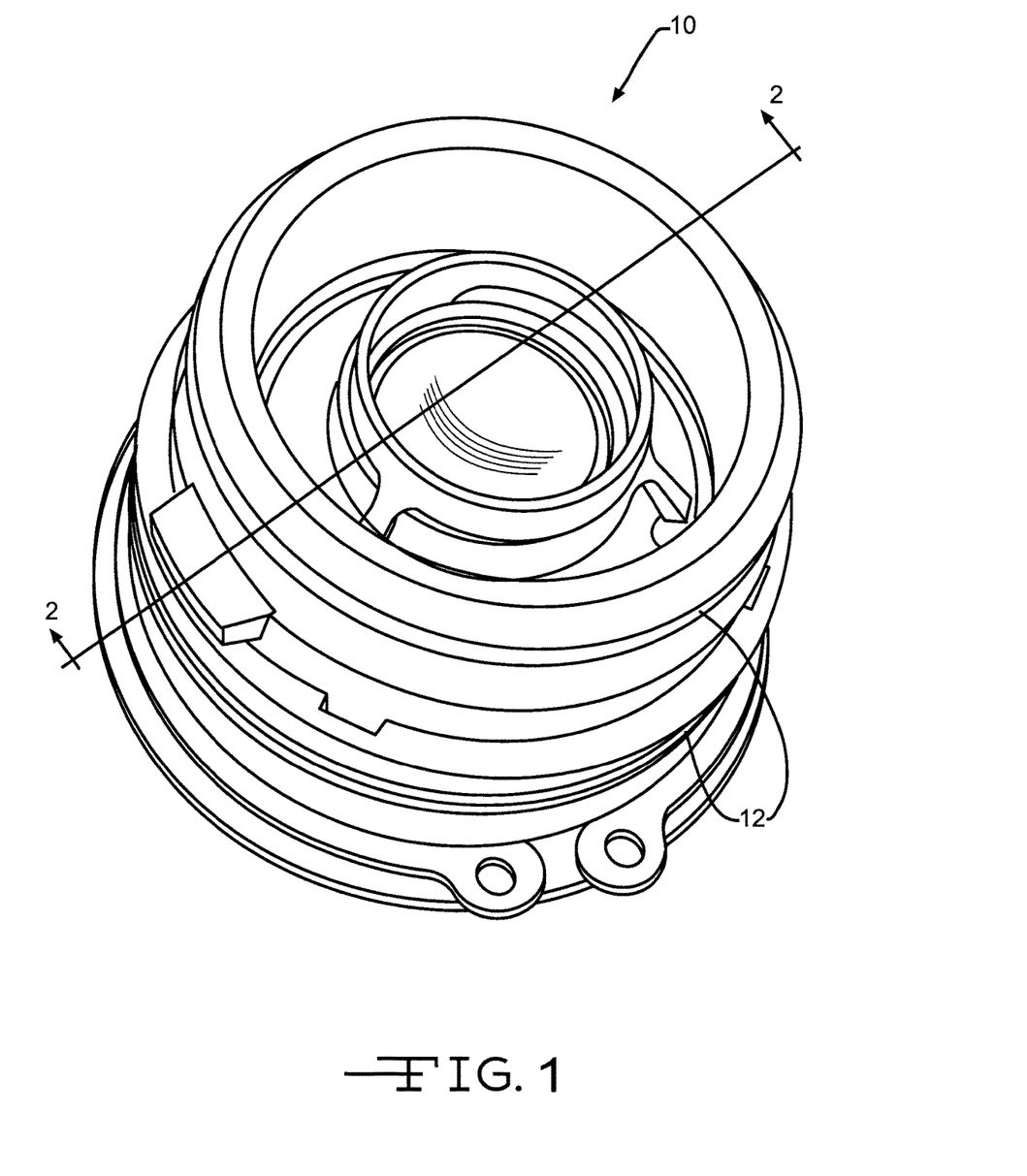
FIG. 1 is an illustration of a top perspective view of one embodiment of a valve apparatus.
Figure 2:
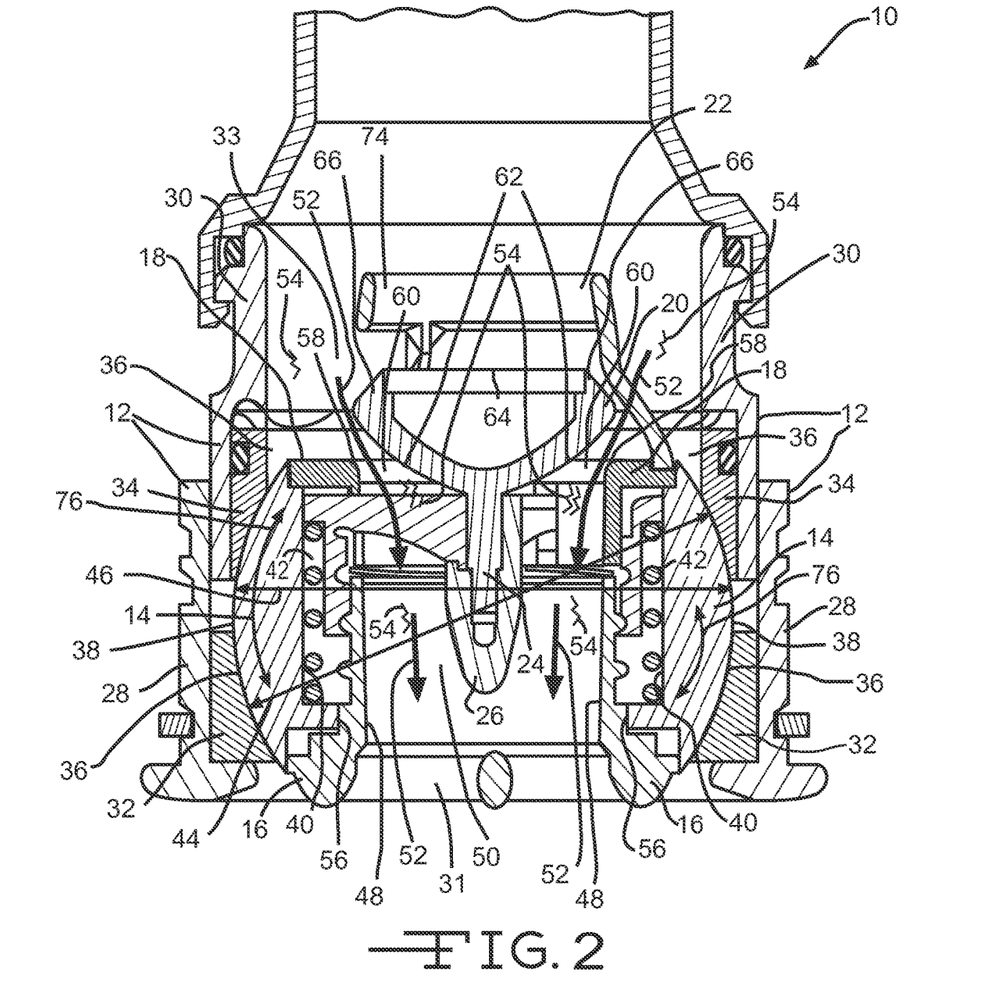
FIG. 2 is an illustration of a cross-section view through line 2-2 of the embodiment of FIG. 1 with a poppet valve of the valve apparatus in an open position relative to a valve seat, and a stop cage disposed apart from an outer housing.

FIG. 1 is an illustration of a top perspective view of one embodiment of a valve apparatus 10. The valve apparatus 10 may comprise an airplane valve, a personal air outlet valve, and/or another type of valve apparatus. FIG. 2 is an illustration of a cross-section view through line 2-2 of the embodiment of FIG. 1. As shown in FIGS. 1-2, the valve apparatus 10 may include an outer housing 12, an inner housing 14, a nozzle 16, a valve seat 18, a moveable poppet valve 20, a stop cage 22, and first and second mating portions 24 and 26. The outer housing 12 may comprise a cylindrical bottom outer housing 28 coupled to a cylindrical upper outer housing 30. The outer housing 12 may include inner surfaces 32 and 34 comprising cavity 36. The outer housing 12 may be coupled to an inlet 33 and an exhaust outlet 31 as shown in FIG. 2.

The outer housing 12 may be disposed around the inner housing 14. The inner housing 14 may be rotatably and/or tilting-ably disposed within the cavity 36 of the outer housing 12. The inner housing 14 may comprise a semi-spherical outer surface 38, an inner cavity surface 40, and a cavity 42 extending through the inner cavity surface 40. The inner surfaces 32 and 34 of the outer housing 12 may be semi-spherical in shape with a diameter 44 just larger than a diameter 46 of the semi-spherical outer surface 38 of the inner housing 14 in order to allow the inner-housing 14 to rotate and/or tilt within the cavity 36 of the outer housing 12.

Figure 3:
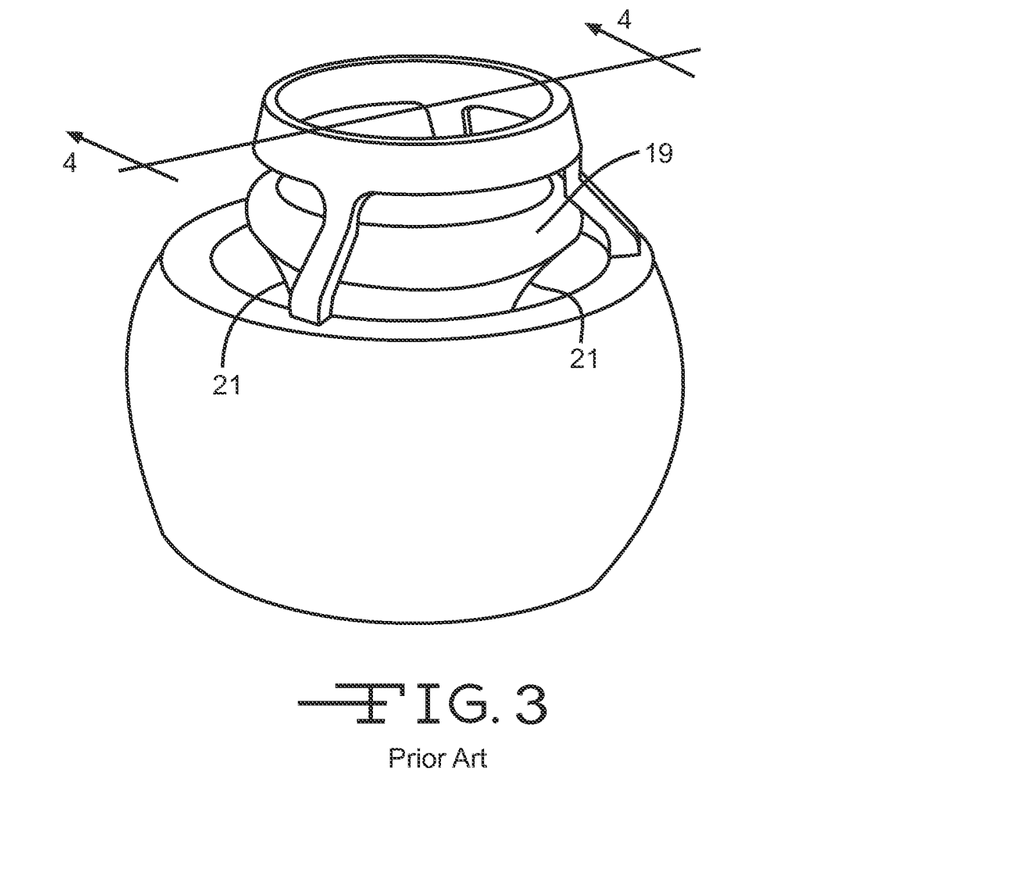
FIG. 3 is an illustration of a front perspective view of one embodiment of a conventional valve apparatus.
Figure 4:
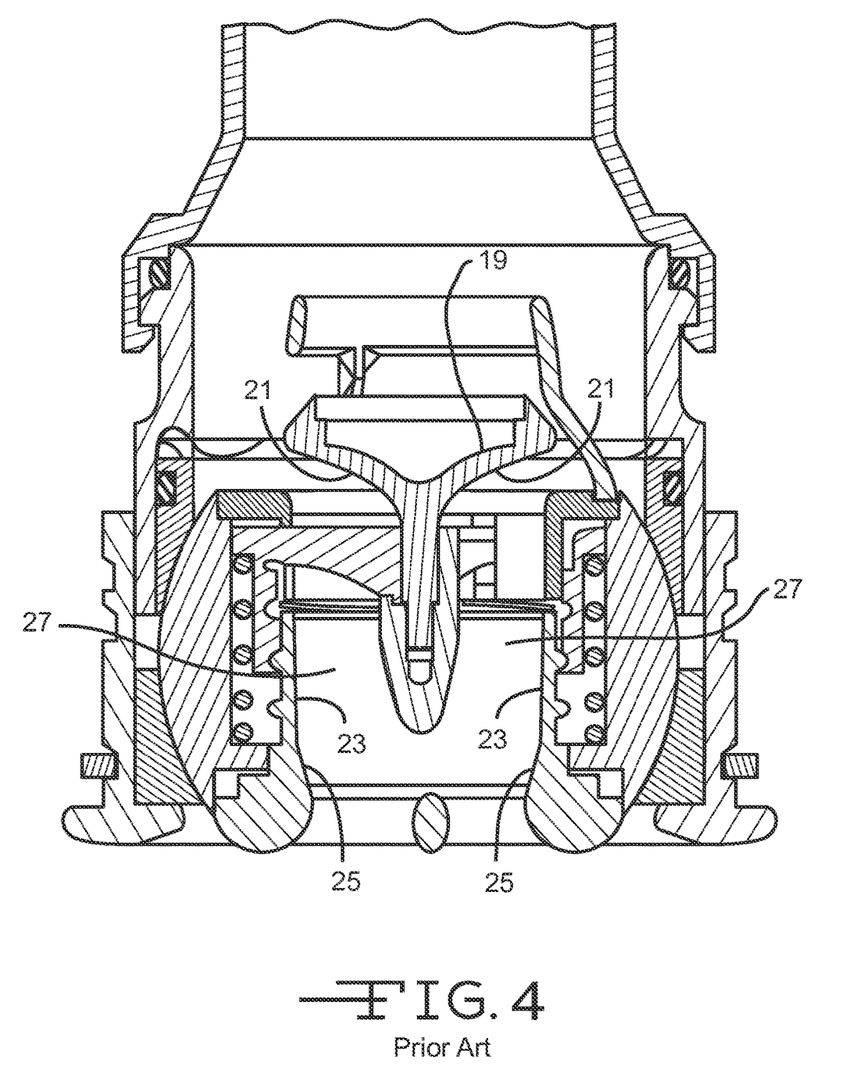
FIG. 4 is an illustration of a cross-section view through line 4-4 of the conventional valve apparatus embodiment of FIG. 3.

The nozzle 16 may comprise an inner air-flow surface 48 having a nozzle cavity 50 extending through the inner air-flow surface 48. The inner air-flow surface 48 may be substantially straight to reduce turbulence, drag, flow separation, and associated noise of air 54 traveling through the nozzle cavity 50 in direction 52. In one embodiment, the substantially straight shape of the inner air-flow surface 48 alone may reduce noise, relative to one embodiment of a conventional poppet valve 19 having a concave poppet valve shape 21 as shown in FIGS. 3 and 4, approximately 2 to 3 decibels adjusted at an airflow 54 through the nozzle cavity 50 of 10 cubic feet per minute and 2 inches $H_2O$. In other embodiments, the shape of the inner air-flow surface 48 alone may reduce noise from varying embodiments of conventional poppet valves in differing amounts at varying airflows. An outer surface 56 of the nozzle 16 may be fixedly coupled to the inner cavity surface 40 of the inner housing 14.

The valve seat 18 may comprise a seat member 58 disposed over the inner-air flow surface 48 over the nozzle cavity 50. The seat member 58 may have a valve cavity 60 which may be in alignment with nozzle cavity 50. The valve seat 18 may comprise a separate part disposed in alignment with the nozzle 16. In other embodiments, the valve seat 18 may comprise a portion of the nozzle 16. The valve seat 18 may be fixedly attached to at least one of the inner housing 14 and the nozzle 16. The inner housing 14 may be disposed around the nozzle 16 and the valve seat 18. Air 54 may flow between valve cavity 60 and nozzle cavity 50.

The moveable poppet valve 20 may be disposed over the seat member 58 and the nozzle cavity 50. The moveable poppet valve 20 may comprise a convex surface 62, the first mating portion 24, and a top surface 64. The convex surface 62 may comprise a smooth, curved, convex shape to reduce air drag, flow separation, turbulence, and air flow noise. The top surface 64 may be open and/or substantially flat. The first mating portion 24 may moveably mate with and relative to the second mating portion 26 disposed within the nozzle cavity 50. In such manner, the moveable poppet valve 20 may be moved between the open position 66 illustrated in FIG. 2 and the closed position 68 illustrated in FIG. 5. The first and second mating portions 24 and 26 may comprise mating male and female members, respectively. The second mating portion 26 may be fixedly attached to at least one of the valve seat 18 and the inner housing 14.

In the open position 66 of FIG. 2, the convex surface 62 may be disposed over and apart from the seat member 58 to allow air 54 to flow in direction 52 from the air inlet 33, against the convex surface 62 at the air inlet 33, between the seat member 58 and the convex surface 62 at the air inlet 33, into and through the nozzle cavity 50, and out of the air outlet 31. In the closed position 68 of FIG. 5, the convex surface 62 may be disposed over and against the seat member 58 at the air inlet 33. When the convex surface 62 is in the closed position 68, air 54 may flow from the air inlet 33 against the convex surface 62, with the seating of the convex surface 62 against the seat member 58 substantially preventing the air 54 from: flowing between the seat member 58 and the convex surface 62, at the air inlet 33, into and through the nozzle cavity 50, and out of the air outlet 31.

Figure 5:
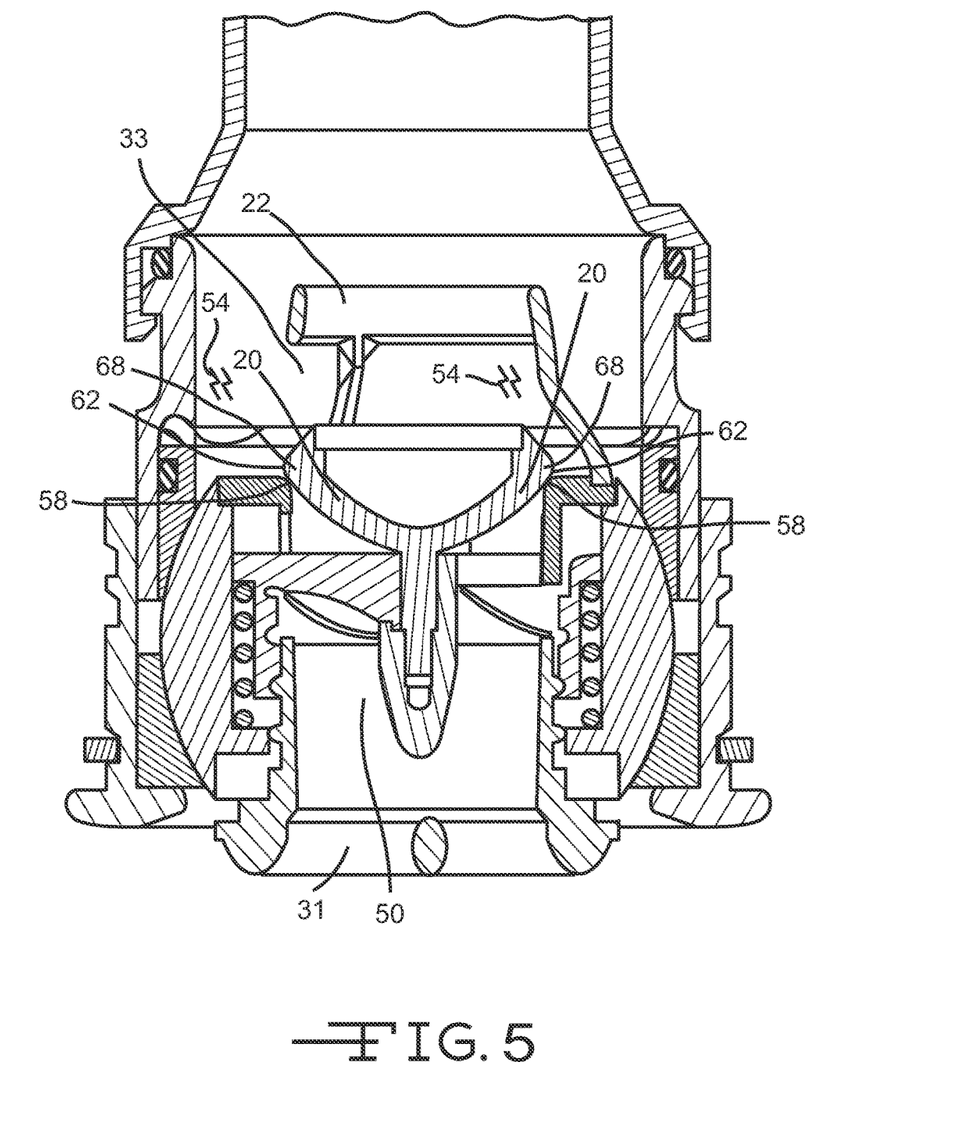
FIG. 5 is an illustration of the cross-section view of the embodiment of FIG. 2 with the poppet valve of the valve apparatus moved to a closed position against the valve seat.

The shape of the convex surface 62 may substantially reduce turbulence, drag, flow separation, and associated noise of air 54 traveling through the nozzle cavity 50 in direction 52, both in the open position 66 of FIG. 2 and in the closed position 68 of FIG. 5. This may result from the smooth, curved shape of the convex surface 62. In one embodiment, the shape of the convex surface 62 alone may reduce noise, relative to one embodiment of a conventional poppet valve having a concave poppet valve shape, approximately 2 to 3 decibels adjusted at an airflow 54 through the nozzle cavity 50 of 10 cubic feet per minute and 2 inches $H_2O$. In other embodiments, the shape of the convex surface 62 alone may reduce noise from varying embodiments of conventional poppet valves in differing amounts at varying airflows.

Figure 6:
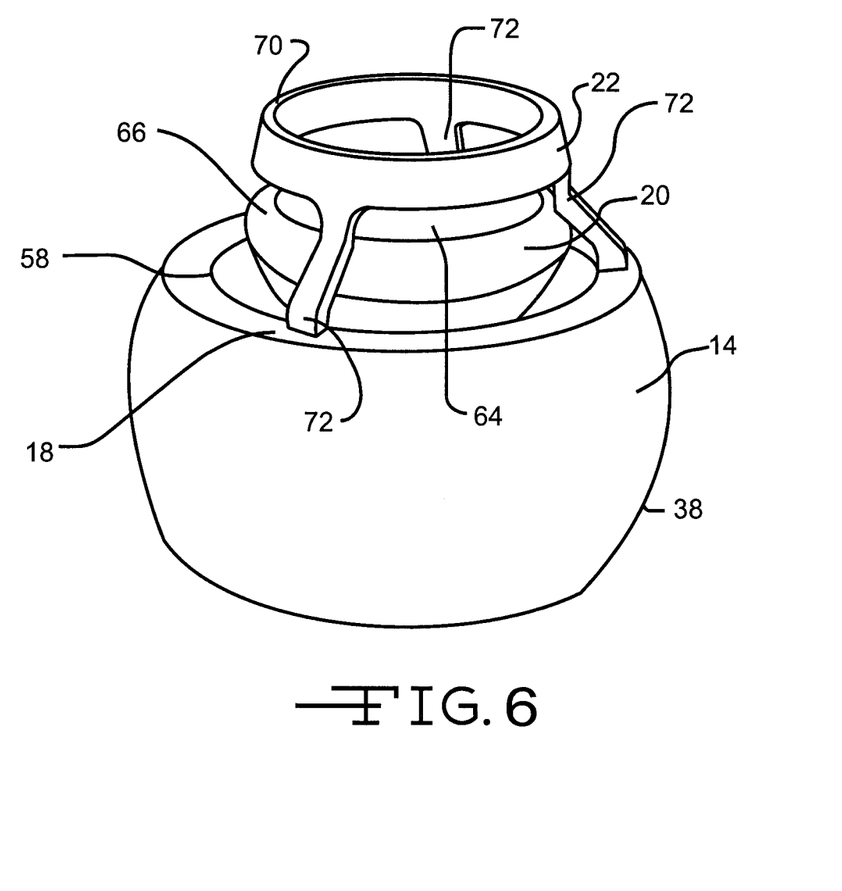
FIG. 6 is an illustration of a front perspective view of one embodiment of an inner housing, an attached stop cage, and an attached moveable poppet valve removed from an outer housing of the valve apparatus of FIG. 1.

As shown in FIGS. 2 and 5, the stop cage 22 may be disposed over the moveable poppet valve 20, the seat member 58, and the nozzle cavity 50. FIG. 6 is an illustration of a front perspective view of the semi-spherical outer surface 38 of the inner housing 14, the stop cage 22, and the moveable poppet valve 20 removed from the outer housing 12 of FIG. 1. The moveable poppet valve 20 is in the open position 66 relative to the seat member 58. As shown in FIG. 6, the stop cage 22 may comprise a circular member 70 fixedly attached to at least one of the valve seat 18 and the inner housing 14 with attachment members 72. Due to the shape of the top surface 64 of the moveable poppet valve 20, the moveable poppet valve 20 may fit between the seat member 58 and the stop cage 22.

Figure 7:
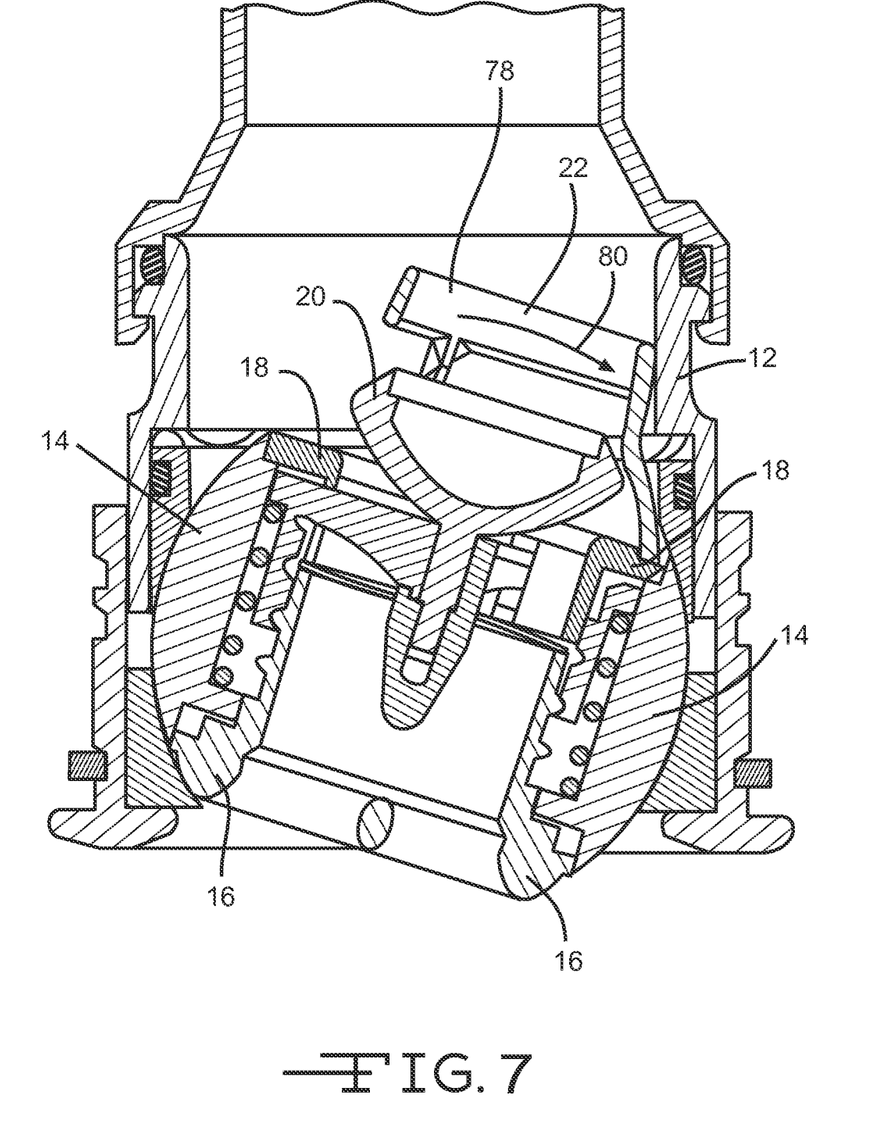
FIG. 7 is an illustration of the cross-section view of the embodiment of FIG. 2 with the stop cage disposed against the outer housing.

As illustrated in FIG. 2, when the stop cage 22 is disposed in position 74 apart from the outer housing 12, the nozzle 16, valve seat 18, moveable poppet valve 20, stop cage 22, and inner housing 14 may rotate and/or tilt together in any direction 76 within and relative to the outer housing 12. FIG. 7 is an illustration of the stop cage 22 of the embodiment of FIG. 2 disposed in position 78 against the outer housing 12. When the stop cage 22 rotates and/or tilts from the position 74 of FIG. 2 to the position 78 of FIG. 7, the stop cage 22 touches the outer housing 12 which substantially restricts the nozzle 16, valve seat 18, moveable poppet valve 20, stop cage 22, and inner housing 14 from rotational movement and/or tilting in at least one direction 80 relative to the outer housing 12.

As shown in FIGS. 3 and 4, in one embodiment of a conventional poppet valve 19 having a concave poppet valve shape 21 and an inner air-flow nozzle surface 23 with a beveled end constriction 25, the conventional poppet valve 19 may have a noise level of approximately 56 dBA, comprising the A-weighted overall sound pressure level in decibels, adjusted at an airflow through the nozzle cavity 27 of 10 cubic feet per minute and 2 inches $H_2O$. These noise level measurements may have been taken at a distance of 20 inches from the nozzle discharge. Due to the combination of the substantially straight inner air-flow surface 48 and the shape of the convex moveable poppet valve 20 reducing air turbulence, flow separation, and drag, the valve apparatus 10 of FIGS. 1-2 and 5-7 may have a noise level substantially in a range of 51 to 52 dBA adjusted at an airflow 54 through the nozzle cavity 50 of 10 cubic feet per minute and 2 inches $H_2O$. This is a substantial noise reduction of 4 to 5 decibels adjusted at an airflow through the nozzle cavity of 10 cubic feet per minute and 2 inches $H_2O$. In other embodiments, the shape of the substantially straight inner air-flow surface 48 and the shape of the convex moveable poppet valve 20 may reduce noise in differing amounts at varying airflows.

Figure 8:
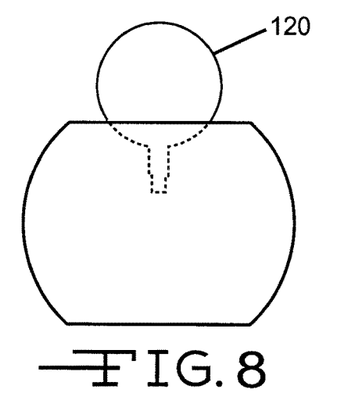
FIG. 8 is an illustration of a side view of one embodiment of a moveable poppet valve having a spherical shape.
Figure 8A:
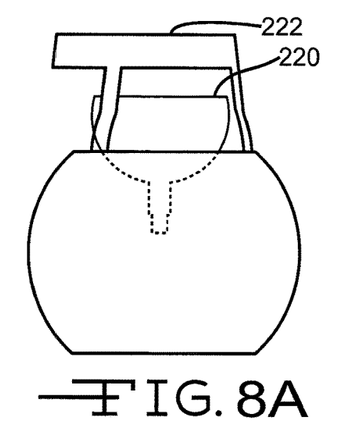
FIG. 8A is an illustration of a side view of one embodiment of a moveable poppet valve having a semi-spherical shape.
Figure 8B:
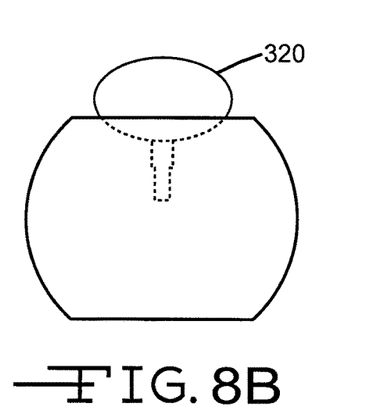
FIG. 8B is an illustration of a side view of one embodiment of a moveable poppet valve having a spheroid shape.
Figure 8C:
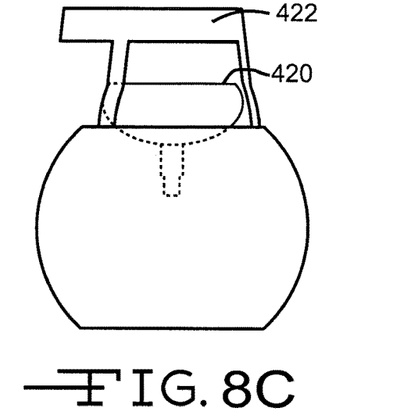
FIG. 8C is an illustration of a side view of one embodiment of a moveable poppet valve having a semi-spheroid shape.
Figure 8D:
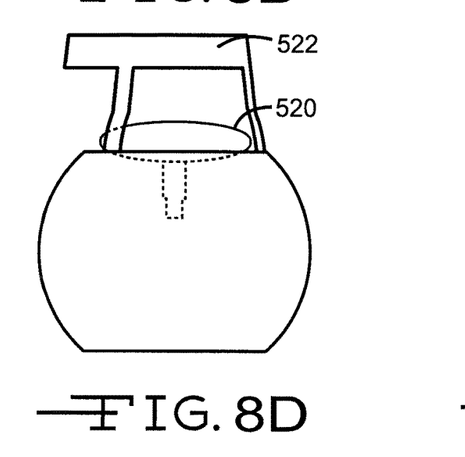
FIG. 8D is an illustration of a side view of one embodiment of a moveable poppet valve having an ellipsoid shape.
Figure 8E:
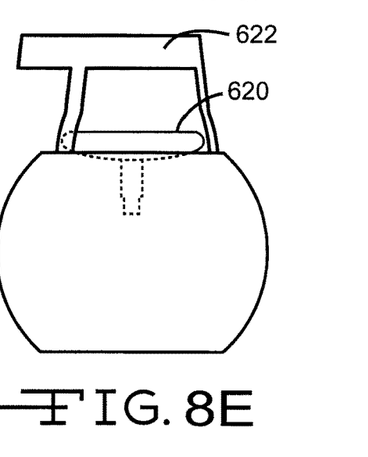
FIG. 8E is an illustration of a side view of one embodiment of a moveable poppet valve having a semi-ellipsoid shape.

FIGS. 8 through 8E are illustrations of side views of moveable poppet valves 120, 220, 320, 420, 520, and 620 having respectively a spherical shape, a semi-spherical shape, a spheroid shape, a semi-spheroid shape, an ellipsoid shape, and a semi-ellipsoid shape. Any of the embodiments of FIGS. 8 through 8E may be substituted for the moveable poppet valve 20 of FIGS. 1-2 and 5-7. Due to the size of the moveable poppet valves 120 and 320 of FIGS. 8 and 8B, the stop cage 22 of FIGS. 1-2 and 5-7 may be eliminated when using the moveable poppet valves 120 and 320 of FIGS. 8 and 8B. Due to the size of the moveable poppet valves 220, 420, 520, and 620 of FIGS. 8A, 8C, 8D, and 8E, they may each utilize stop cages 222, 422, 522, and 622. In other embodiments, varying shaped and sized moveable poppet valves may be utilized, with and without stop cages.

Figure 9:
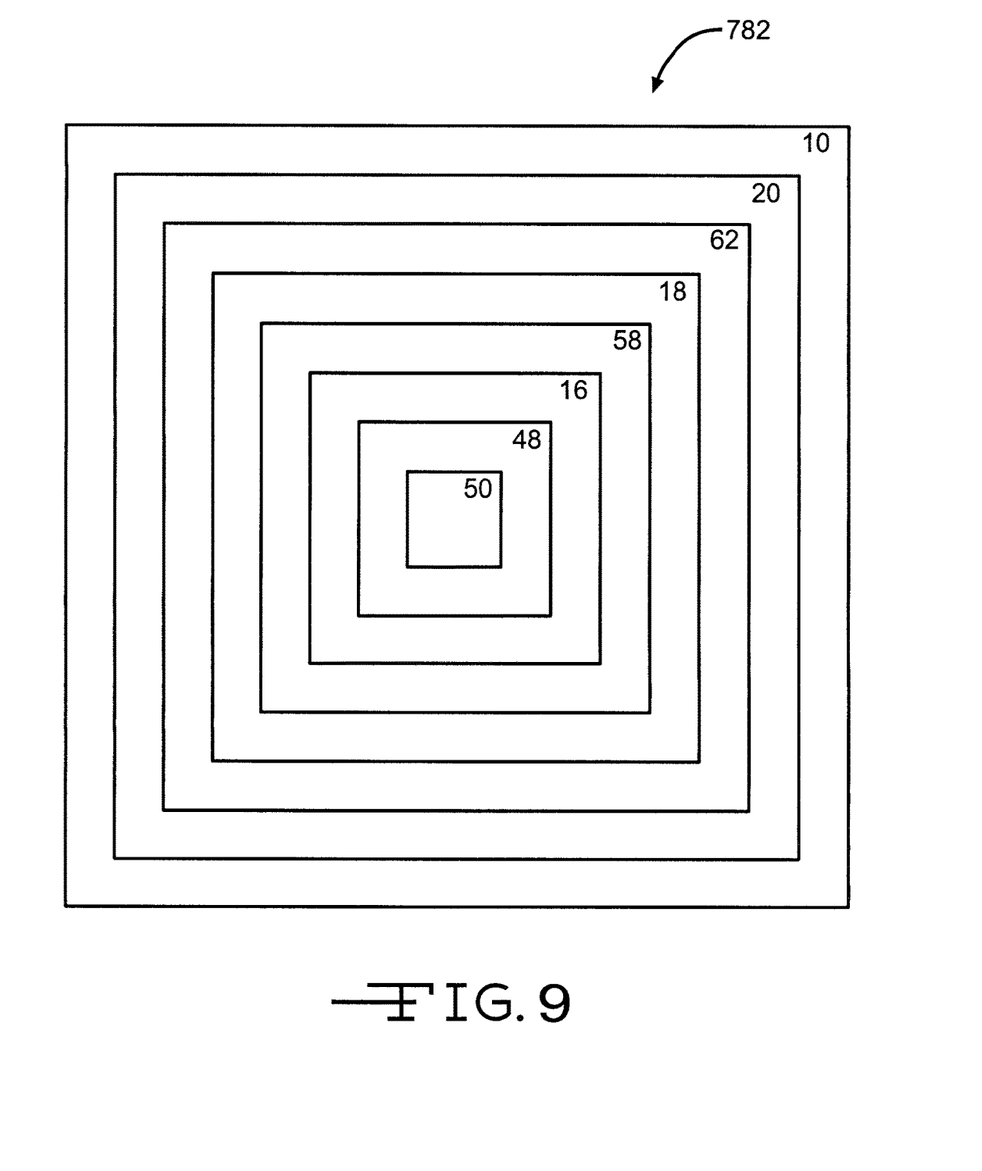
FIG. 9 is an illustration of one embodiment of a functional block diagram of a simplified valve apparatus.

FIG. 9 is an illustration of one embodiment of a functional block diagram 782 of a simplified valve apparatus 10. The simplified valve apparatus may include a nozzle 16, a valve seat 18, and a moveable poppet valve 20. The nozzle 16 may comprise an inner air-flow surface 48 having a nozzle cavity 50 extending through the inner air-flow surface 48. The inner air-flow surface 48 may be substantially straight to reduce turbulence, drag, flow separation, and associated noise of air traveling through the nozzle cavity 50. The valve seat 18 may comprise a seat member 58 disposed at an end of the inner air-flow surface 48 with the seat member 58 disposed over the nozzle cavity 50. The moveable poppet valve 20 may be disposed over the seat member 58 and the nozzle cavity 50. The moveable poppet valve 20 may comprise a convex surface 62, which in an open position, may be disposed over and apart from the seat member 58. When the moveable poppet valve 20 is in this open position, air may flow from the air inlet 33, against the convex surface 62 at the air inlet 33, between the seat member 58 and the convex surface 62 at the air inlet 33, into and through the nozzle cavity 50, and out of the air outlet 31. In a closed position, the convex surface 62 may be disposed over and against the seat member 58 at the air inlet 33 allowing air 54 to flow from the air inlet 33 against the convex surface 62, while the seating of the convex surface 62 against the seat member 58 substantially prevents the air 54 from flowing: between the seat member 58 and the convex surface 62, at the air inlet 33, into and through the nozzle cavity 50, and out of the air outlet 31. The convex surface 62 may comprise a smooth, curved, bulging outward shape to reduce air drag, flow separation, turbulence, and air flow noise.

Figure 10:
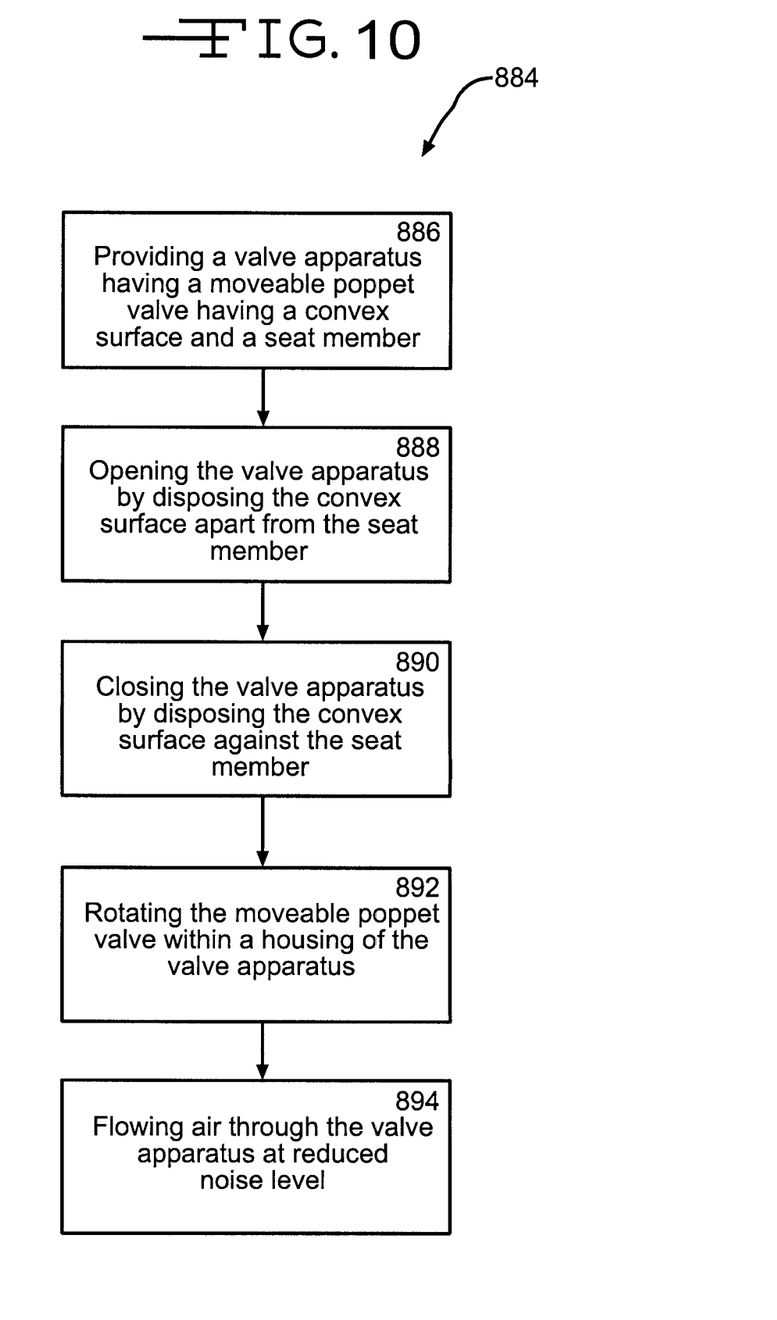
FIG. 10 is an illustration of a flowchart of one embodiment of a method of reducing noise in a valve apparatus.

FIG. 10 is an illustration of one embodiment of a method 884 of reducing noise in a valve apparatus 10. In step 886, a valve apparatus 10 may be provided. The provided valve apparatus 10 may comprise an airplane air outlet valve, a personal air outlet valve, and/or another type of valve apparatus. The provided valve apparatus 10 may comprise any of the embodiments disclosed herein. In one embodiment, the provided valve apparatus 10 may comprise a nozzle 16, a valve seat 18, and a moveable poppet valve 20. The nozzle 16 may comprise an inner air-flow surface 48 having a nozzle cavity 50 extending through the inner air-flow surface 48. The inner air-flow surface 48 may be substantially straight. The valve seat 18 may comprise a seat member 58 disposed at an end of the inner air-flow surface 48. The seat member 58 may be disposed over the nozzle cavity 50.

The moveable poppet valve 20 may be disposed over the seat member 58 and the nozzle cavity 50. The moveable poppet valve 20 may comprise a convex surface 62, a first mating portion 24, and a top surface 64. The top surface 64 may be open and/or substantially flat. In other embodiments, the moveable poppet valve 20 may comprise any of the embodiments of FIGS. 8 through 8E. In still other embodiments, the moveable poppet valve 20 may vary in shape and/or size. A second mating portion 26 may be disposed within the nozzle cavity 50. The first and second mating portions 24 and 26 may comprise mating male and female portions. The provided apparatus 10 may further comprise a stop cage 22 disposed over the moveable poppet valve 20, the seat member 58, and the nozzle cavity 50. An inner housing 14 may be disposed around the nozzle 16 and the valve seat 18. An outer housing 12 may be disposed around the inner housing 14.

In step 888, the moveable poppet valve 20 may be opened by disposing the convex surface 62 over and apart from the seat member 58 at the air inlet 33 to flow air 54 from the air inlet 33, against the convex surface 62 at the air inlet 33, between the seat member 58 and the convex surface 62 at the air inlet 33, into and through the nozzle cavity 50, and out of the air outlet 31.

In step 890, the moveable poppet valve 20 may be closed by disposing the convex surface 62 over and against the seat member 58 at the air inlet 33 so that air 54 flows from the air inlet 33 against the convex surface 62, with the convex surface 62 seated against the seat member 58 substantially preventing the air 54 from flowing: between the seat member 58 and the convex surface 62 at the air inlet 33, into and through the nozzle cavity 50, and out of the air outlet 31. Step 888 and 890 may comprise moveably mating the first and second mating portions relative to one another in order to move the moveable poppet valve 20 from the open position 66 to the closed position 68 relative to the seat member 58.

In step 892, the nozzle 16, valve seat 18, moveable poppet valve 20, stop cage 22, and inner housing 14 may be rotated and/or tilted together, within and relative to the outer housing 12, from a position 74 in which the stop cage 22 is disposed apart from the outer housing 12, to a position 78 in which the stop cage 22 is disposed against the outer housing 12.

In step 894, air 54 may be flowed through the nozzle cavity 50 at a rate of 10 cubic feet per minute and 2 inches $H_2O$ to provide a reduced noise level of the provided valve apparatus 10 substantially in a range of between 51 to 52 dBA. In other embodiments, the provided valve apparatus may vary in shape, size, configuration, and/or may have a varying noise level. In still other embodiments, one or more of the steps of the method 884 may be modified, eliminated, done in a varying order, and/or one or more additional steps may be added.

Figure 11:
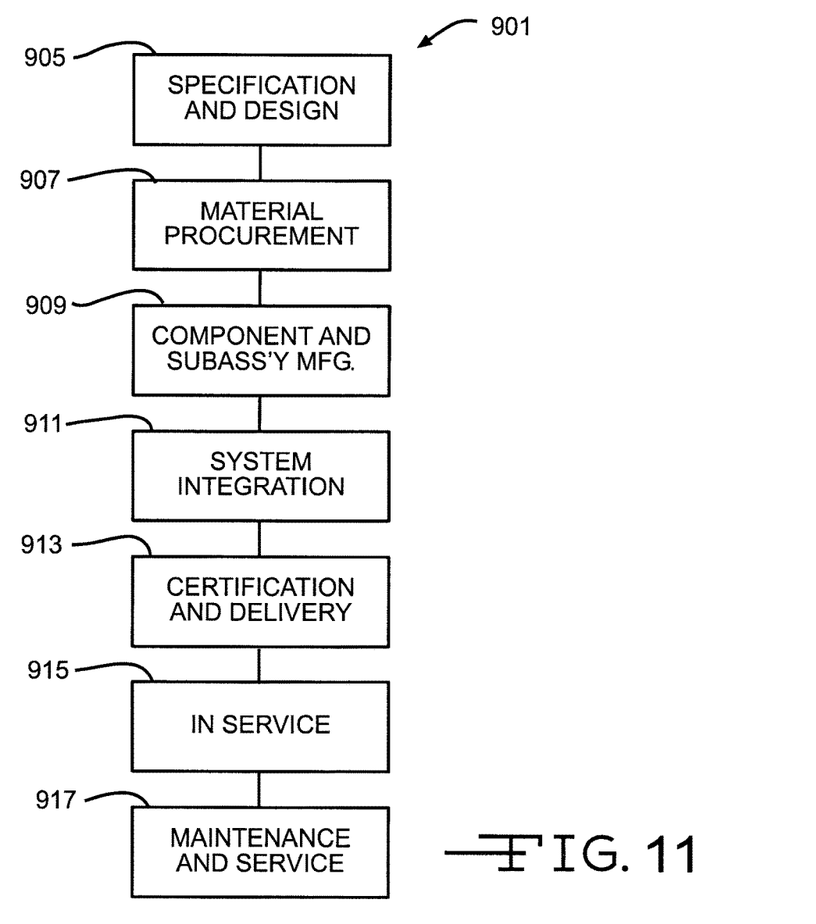
FIG. 11 is a flow diagram of aircraft production and service methodology.
Figure 12:
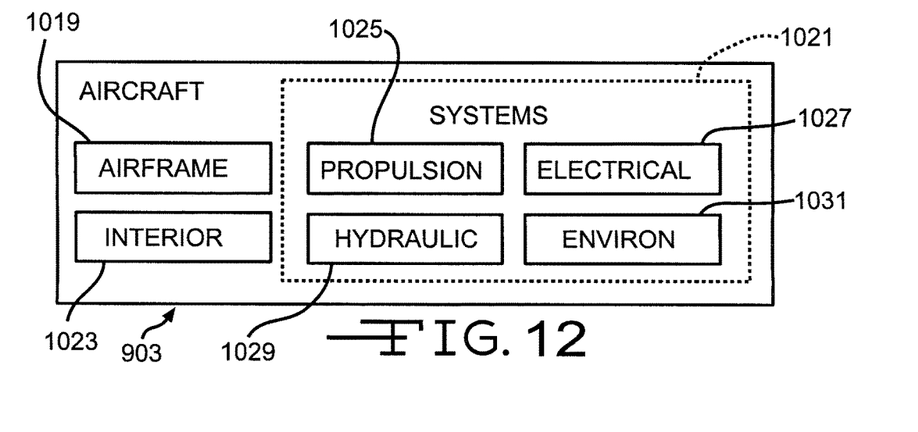
FIG. 12 is a block diagram of an aircraft.

Referring more particularly to the drawings, embodiments of the disclosure may be described in the context of an aircraft manufacturing and service method 901 as shown in FIG. 11 and an aircraft 903 as shown in FIG. 12. During pre-production, exemplary method 901 may include specification and design 905 of the aircraft 903 and material procurement 907. During production, component and subassembly manufacturing 909 and system integration 911 of the aircraft 903 takes place. Thereafter, the aircraft 903 may go through certification and delivery 913 in order to be placed in service 915. While in service by a customer, the aircraft is scheduled for routine maintenance and service 917 (which may also include modification, reconfigurations, refurbishment, and so on).

Each of the processes of method 901 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 903 produced by exemplary method 901 may include an airframe 1019 with a plurality of systems 1021 and an interior 1023. Any of the valve apparatus 10, 220, 320, 420, 520, and 620 of FIGS. 1-2 and 5-9 may be used in the interior 1023 of aircraft 903. Examples of high-level systems 1021 include one or more of a propulsion system 1025, an electrical system 1027, a hydraulic system 1029, and an environmental system 1031. Any number of other systems may be included. Although an aerospace example is shown, the principles of the invention may be applied to other industries, such as the automotive industry.

Apparatus and methods embodied herein may be employed during any one or more of the stages of the production and service method 901. For example, components or subassemblies corresponding to production process 909 may be fabricated or manufactured in a manner similar to components or subassemblies produced while the aircraft 903 is in service. Also, one or more apparatus embodiments, method embodiments, or a combination thereof may be utilized during the production stages 909 and 911, for example, by substantially expediting assembly of or reducing the cost of an aircraft 903. Similarly, one or more of apparatus embodiments, method embodiments, or a combination thereof may be utilized while the aircraft 903 is in service, for example and without limitation, to maintenance and service 917.

One or more embodiments of the disclosure may reduce one or more problems of one or more of the conventional valve apparatus and/or methods of flowing air within a conventional valve apparatus. For instance, one or more embodiments of the disclosure may decrease drag, may decrease flow separation, may decrease turbulence, and/or may decrease air flow noise within the valve apparatus. This may reduce annoying noise-levels to humans near the valve apparatus. In other embodiments, additional types of problems of one or more conventional valve apparatus, and/or methods of flowing air within a conventional valve apparatus, may be reduced.

It should be understood, of course, that the foregoing relates to exemplary embodiments of the disclosure and that modifications may be made without departing from the spirit and scope of the disclosure as set forth in the following claims.

I claim:

1. A method of reducing noise in a valve apparatus comprising:
   providing a valve apparatus comprising: an air inlet, an air outlet, a nozzle comprising an inner air-flow surface having a nozzle cavity, extending along the inner airflow surface, in communication with the air inlet; a valve seat comprising a seat member disposed over the nozzle cavity at the air inlet; and a moveable poppet valve, comprising a convex surface, disposed, at the air inlet, over the seat member and the nozzle cavity;
   opening the moveable poppet valve by disposing the convex surface over and apart from the seat member at the air inlet to flow air from the air inlet, against the convex surface at the air inlet, between the seat member and the convex surface at the air inlet, into and through the nozzle cavity, and out of the air outlet; and
   closing the moveable poppet valve by disposing the convex surface, at the air inlet, over and against the seat member to substantially prevent air from flowing between the seat member and the convex surface.

2. The method of claim 1 wherein the provided valve apparatus further comprises a stop cage disposed, at the air inlet, over the moveable poppet valve, the seat member, and the nozzle cavity.

3. The method of claim 2 wherein the provided valve apparatus further comprises an inner housing disposed around the nozzle and the valve seat.

4. The method of claim 3 wherein the provided valve apparatus further comprises an outer housing disposed around the inner housing, and further comprising the step of at least one of rotating or tilting the nozzle, valve seat, moveable poppet valve, stop cage, and inner housing together, within and relative to the outer housing, from a position in which the stop cage is disposed apart from the outer housing, to a position in which the stop cage is disposed against the outer housing.

5. The method of claim 1 wherein the provided valve apparatus further comprises a first mating portion of the moveable poppet valve and a second mating portion disposed within the nozzle cavity, and the opening and closing steps further comprise moveably mating the first and second mating portions relative to one another.

6. The method of claim 5 wherein the first mating portion and the second mating portion comprise mating male and female members.

7. The method of claim 1 wherein the provided valve apparatus comprises an airplane valve.

8. The method of claim 1 further comprising the step of flowing air through the nozzle cavity at a rate of 10 cubic feet per minute and 2 inches $H_2O$ to provide a noise level of the provided valve apparatus substantially in a range of between 51 to 52 dBA.

9. The method of claim 3 wherein the nozzle cavity is open at the air outlet during both of the opening and closing steps.

10. The method of claim 3 wherein the nozzle cavity is largest at the air outlet.

11. The method of claim 1 wherein the step of closing the moveable poppet valve further comprises disposing the convex surface of the moveable poppet valve, at the air inlet, over and directly against the seat member.

12. The method of claim 11 wherein the provided valve apparatus further comprises a first mating portion of the moveable poppet valve and a second mating portion disposed within the nozzle cavity, the convex surface of the moveable poppet valve begins at the first mating portion, and the opening and closing steps further comprise moveably mating the first and second mating portions relative to one another.

13. The method of claim 12 wherein the first mating portion and the second mating portion comprise mating male and female members.

\* \* \* \* \*